United States Patent Office 3,381,040
Patented Apr. 30, 1968

3,381,040
PREPARATION OF ORGANIC HALIDES
Leonard Haynes Long and Graham Frederick Freeguard, Exeter, Devon, England, assignors to National Research Development Corporation, London, England
No Drawing. Filed Feb. 9, 1965, Ser. No. 431,461
Claims priority, application Great Britain, Feb. 10, 1964, 5,482/64; Mar. 25, 1964, 12,567/64
14 Claims. (Cl. 260—633)

ABSTRACT OF THE DISCLOSURE

Process for preparing organic halides by reacting ethers, epoxides, alcohols, aldehydes and ketones with halogens and certain boron compounds.

---

This invention relates to the preparation of organic halides.

The preparation of organic halides is carried out on a commercial scale by a number of routes. Thus, in preparing the simple aliphatic halides one method involves suspending red phosphorus in the corresponding aliphatic alcohol and subsequently adding the halogen. This method is of special usefulness for the preparation of iodides and yields of over 90% can be obtained for methyl, ethyl, n-propyl, n-butyl and n-amyl iodide. Another widely used method involves reacting the gaseous hydrogen halide or the constant-boiling aqueous solution of hydrogen halide with the alcohol, often with sulphuric acid present. This method can give yields, as in the case of ethyl bromide, of 90–95%.

However, both these methods require heating and invariably produce a number of by-products as well; also catalysts are sometimes required, as in the preparation of methyl chloride from methanol, hydrochloric acid and zinc chloride.

In contrast to these difficulties, it has now been found that organic halides can be prepared in good yields of up to 90% or more under very mild conditions by direct reaction of a corresponding oxygenated compound with the native halogen in the presence of a small quantity of boron hydride or metal borohydride.

However, it is in general more difficult to obtain the high yields in the case of chlorides than in the case of bromides or iodides.

The net result of the reaction is a cleavage of the carbon-oxygen link and replacement of the oxygenated substituent (hydroxyl, alkoxy or other oxy-organic radical) by the halogen.

In its most general sense, the present invention therefore provides a process for the preparation of organic halides which comprises reacting an organic compound containing a carbon-oxygen link with a halogen in the presence of a hydro-boron compound.

By "halogen" in this context there is meant either the native or elementary halogens $Cl_2$, $Br_2$ or $I_2$, or an interhalogen compound, e.g. iodine monochloride, iodine trichloride, or iodine monobromide, and by "halides" the chlorides, bromides, or iodides, excluding the fluorides. By "hydro-boron" compound is meant a compound containing at least one boron-hydrogen (B-H) linkage, the principal members of this class of compound being of course the boron hydrides and the metal borohydrides.

For example with diborane, a preferred boron hydride, complete cleavage of ethers takes place at room temperature and pressure when the reaction is carried out in glass vessels. Another preferred boron hydride is pentaborane. Decaborane may also be used.

Iodine is the most widely applicable halogen. The iodine is by preference added first to the liquid ether and then the diborane introduced. A rapid (but not violent) reaction sets in and precedes smoothly to completion, the end of the reaction being marked by the disappearance of the iodine colour. The reaction is mildly exothermic and hydrogen is liberated.

The process of the present invention is applicable both to singly and doubly bonded carbon-oxygen linkages, i.e. both to compounds containing

groupings and to those containing groupings $$>C=O$$

Amongst the former type, alcohols, ethers and epoxides comprise a preferred group. Amongst the latter, aldehydes and ketones are another preferred group.

Alcohols may be employed often with advantage in place of ethers and also other halogens like bromine, chlorine in place of iodine. With bromine, the colour disappearance can again be employed as a test for completion of reaction. With chlorine, it will frequently not be possible to dissolve sufficient of the halogen at atmospheric pressure to obtain complete conversion. Accordingly, where complete conversion is required it may be desirable to increase the pressure or reduce the temperature to the point where chlorine liquifies. Alternatively it may be advantageous to carry out the reaction in an inert solvent such as carbon tetrachloride. Where it is convenient to do neither, it may on occasions be preferable to employ an interhalogen compound of chlorine such as iodine monochloride or iodine trichloride in place of native chlorine, and separate the organic chloride from the mixture of halides produced by fractionation. With chlorine, and iodine chlorides, and to a lesser extent with bromine and iodine bromide, part of the hydrogen liberated as with iodine is replaced by the corresponding hydrogen halide. Hydrogen iodide does not make an appearance except occasionally in trace amounts.

With interhalogen compounds a mixture of organic halides may be produced although with iodine interhalogen compounds the iodide is sometimes produced in much better yield.

The reaction may be applied to a wide variety of alcohols and ethers. Amongst alcohols, there can be mentioned aliphatic alcohols for example methyl alcohol, ethyl alcohol. Ethers both of symmetrical and asymmetrical constitution can be employed, for example diethyl ether and ethyl propyl ether respectively. Aromatic derivatives are also embraced, like benzyl alcohol, phenyl methyl ether (anisole), phenyl ethyl ether (phenetole). So also are cyclic ethers, like ethylene oxide and tetrahydrofuran, and alcohols, like cyclexanol, the reaction breaking open the ring in the case of the ethers. Alternatively, the ethylene oxide ring can be regarded as an epoxy ring.

In general, alcohols of formula $R^1OH$ and ethers of formula $R^2OR^3$ where $R^1$ is an alkyl, substituted alkyl or alicyclic group and $R^2$, $R^3$ are the same or different alkyl, alicyclic, aryl, substituted alkyl, or substituted aryl groups, or jointly provide with the ether oxygen a cyclic ring compound, are suitable starting materials. In the last instance, if the ring is 3-membered only the compound can also be regarded as an epoxide. The alkyl or substituted alkyl groups may be straight-chain or branched.

Examples of substituted alkyl groups include alkoxyalkyl, hydroxyalkyl, cyanoalkyl, aminoalkyl, haloalkyl and aralkyl groups. Other possibilities will of course occur to those skilled in the art.

Where $R^1$ is a hydroxyalkyl group the compound is of course a polyhydric alcohol, and with corresponding larger amounts of the other reactants the reaction may convert all the hydroxyl groups to halide groups, i.e. to the corresponding polyhalide. When more than one ether linkage is present, as when $R^2$ or $R^3$ are alkoxy-alkyl, cleavage may occur at both to provide a mixture of halide products. Similar mixtures of halides, and/or polyhalides, may be produced when both a hydroxyl group and an ether linkage are present in the starting compound.

Suitable ketones are those of formula $R^4COR^5$ wherein $R^4$, $R^5$ are the same or different alkyl, alicyclic, aryl, substituted alkyl or substituted aryl groups. Examples of these include acetone, methyl ethyl ketone, diethyl ketone, cyclohexanone, benzophenone.

Suitable aldehydes are those of formula $R^6CHO$ wherein $R^6$ is an alkyl, alicyclic, aryl, substituted alkyl or substituted aryl group, examples here including acetaldehyde, propionaldehyde, n-butyraldehyde, benzaldehyde, α-naphthaldehyde.

As will be appreciated possibilities of $R^4$, $R^5$ and $R^6$ as regards substituted alkyl groups will include those enumerated above for $R^1$, $R^2$ and $R^3$.

Ketones and aldehydes provide secondary and primary halides respectively on reaction according to the present process.

The reaction is fundamentally a liquid-phase reaction and is normally complete within minutes at room temperature. Compounds which are normally in the gaseous state, like dimethyl ether (B. Pt. −24.9° C.) or in the solid state, like diphenyl ether (M. Pt. 27° C.), are unreactive at room temperature. Moreover, if, for example, the diphenyl ether is heated above its melting-point with iodine and a trace of diborane the main product is not phenyl iodide but instead cyclohexanyl iodide. Phenol also fails to give phenyl iodide readily.

In general, when the starting material is a low-melting solid, there is no objection to gentle warming; nor in the case of a low-melting or high-melting solid is there any fundamental objection to carrying out the reaction in an inert solvent such as a paraffin of convenient boiling point.

The employment of a metal borohydride, being solid, has the advantage of greater ease of handling as compared to the boron hydride, and is thus especially useful in the case when the halogen is chlorine. There can also be an advantage as regards cost, in spite of the fact that larger quantities of halogen are required.

Generally, the process when using a metal borohydride is carried out in the same manner as when using a boron hydride. The same wide variety of starting materials, both as regards halogen and oxygenated compound, can be employed. Reaction is smooth and in general moderately rapid although in cases where the metal borohydride has a low solubility in the organic phase it tends to be slower than the corresponding reaction with diborane. When the starting material is an ether, yields similar to those achieved with diborane can be obtained; when the starting material is an alcohol yields are only slightly lower.

Preferred metal borohydrides are the alkali metal borohydrides, for example sodium or lithium borohydride. Other useful borohydrides are those of alkaline earth metals, for example calcium, strontium and barium.

As regards the relative proportions of the reactants, stoichiometric quantities of ether or alcohol and halogen are suitable—i.e. for a monohydric alcohol the molar ratio of alcohol: halogen $X_2$ may be 2:1. For an ether or epoxide, the ratio may likewise be 2:1, although with many ethers it may be as low as 4:3 or possibly even 1:1 (see subsequent equations). However, it is sometimes convenient to use excess of organic reactant. The quantity of boron hydride need only be small in relation to the quantities of the other reactants, the molar ratio of alcohol to diborane, in the instance of this pair of reactants, being normally about 6:1.

However, as will be seen also from the subsequent equations, the boron hydride is not a catalyst as such but takes part in the reaction to give borate-type products, the B—H link being broken and B—O— links created as a result; similarly with the borohydrides. The molar ratio of organic compound:hydroboron compound thus varies according to the boron atomicity of the hydro-boron compound and also on the number of hydroxyl groups, for example, present in the organic compound. Thus in the subsequent examples the ratios vary up to 12:1, in the instance of diethyl ether and pentaborane.

Although the reaction is not yet fully understood, with a boron hydride as hydro-boron compound and with alcohols as the organic compound the reaction can be explained by an equation of the type:

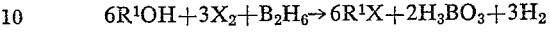
$$6R^1OH + 3X_2 + B_2H_6 \rightarrow 6R^1X + 2H_3BO_3 + 3H_2$$

However, with larger proportions of alcohol some esterification of the boric acid can occur. With ethers cleavage occurs, and the reaction may be tentatively explained by an equation such as

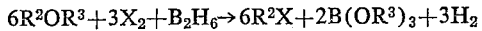
$$6R^2OR^3 + 3X_2 + B_2H_6 \rightarrow 6R^2X + 2B(OR^3)_3 + 3H_2$$

For example, when $R^2$=methyl, $R^3$=phenyl, X=iodine, methyl iodide may be distilled from the triphenyl borate, which yields phenol on subsequent treatment with water. With epoxides such as ethylene oxide, dihalides are not obtained except in trace amounts, the main product being an ester of boric acid which, on subsequent hydrolysis in the cold, immediately yields the corresponding organic halide:

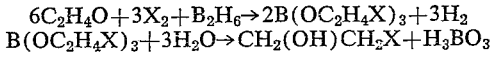
$$6C_2H_4O + 3X_2 + B_2H_6 \rightarrow 2B(OC_2H_4X)_3 + 3H_2$$
$$B(OC_2H_4X)_3 + 3H_2O \rightarrow CH_2(OH)CH_2X + H_3BO_3$$

To obtain the dihalide in good yield, the appropriate dihydric alcohol should be employed as the starting material. However, hydrogen or alkoxy groups which are vicinal to an oxygen or halogen atom exhibit in general a reduced reactivity, so that more vigorous conditions of reaction may be required. Although the hydrolysis step is not normally necessary when the starting material is an ether or alcohol, subsequent treatment with water may on occasions assist in the separation of the organic halide.

With a metal borohydride as hydro-boron compound the relative proportion of the reactants consumed suggest the following as possible tentative equations; in these equations (illustrated in Examples XI and XII) M is a metal of valency $n$; $R^1$, $R^2$ and $R^3$ are organic radicals having meanings as defined generally hereinbefore; and X may be chlorine, bromine or iodine:

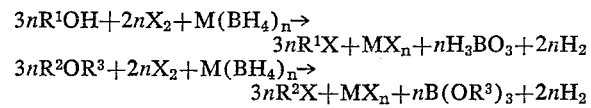
$$3nR^1OH + 2nX_2 + M(BH_4)_n \rightarrow$$
$$3nR^1X + MX_n + nH_3BO_3 + 2nH_2$$
$$3nR^2OR^3 + 2nX_2 + M(BH_4)_n \rightarrow$$
$$3nR^2X + MX_n + nB(OR^3)_3 + 2nH_2$$

In the former equation, larger proportions of alcohol can lead to esterification of the metaboric acid, and it is in any case sometimes convenient to use excess alcohol or ether. Also with alcohols relatively slow side reactions such as

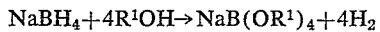
$$NaBH_4 + 4R^1OH \rightarrow NaB(OR^1)_4 + 4H_2$$

are possible. These can be minimised by dissolving the halogen in the alcohol first, a precaution which suppresses competition by the side reactions sufficiently to permit the yields of organic halides to remain high.

In the case of ethers, side reactions of this kind are not possible, but in the presence of sufficient halogen and metal borohydrides the reaction may proceed further and result in the formation of more than one molecule of organic halide from one molecule of ether, which may prove particularly advantageous when $R^2=R^3$ (see, for instance, Examples XIV and XV).

With aldehydes the equation may be written as follows:

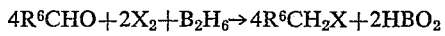
$$4R^6CHO + 2X_2 + B_2H_6 \rightarrow 4R^6CH_2X + 2HBO_2$$

wherein X and $R^6$ have the meanings outlined above.

Similarly with ketones the equation may be written as follows:

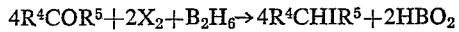
$$4R^4COR^5 + 2X_2 + B_2H_6 \rightarrow 4R^4CHIR^5 + 2HBO_2$$

wherein X and $R^4$, $R^5$ have the meanings outlined above.

It must be emphasized that all the equations given above are tentative, since the mechanism although believed to be essentially the same in each case is not completely understood. The reaction process may be put forward in the broad sense as lying in the ternary reactions:

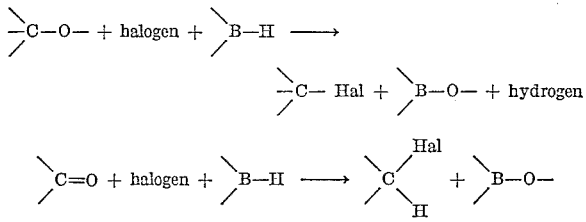

for single and doubly bonded oxygen respectively. Preliminary reactions may also be present. Thus with a metal borohydride it is likely that the boron hydride is released in situ by reaction of the halogen with the borohydride. Thus with sodium borohydride, iodine and a monohydric alcohol, the preliminary reaction may be:

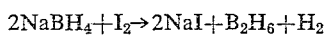

followed by the main reaction:

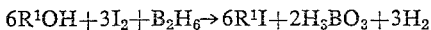

The preliminary reaction is believed to be fast in comparison with the subsequent halogenation and to account for a quarter of the halogen used as reactant.

In order that the present invention may be more clearly understood the following examples are provided by way of illustration. In the examples, Nos. I to X and XVI to XVIII relate to the use of boron hydrides as the hydroboron compound, whilst Nos. XI to XV relate to the use of borohydrides.

Referring to the first group of examples, in order to facilitate the handling of the diborane used and the relatively larger quantities of hydrogen liberated, these examples were all carried out in a 1-litre spherical flask to which a tube 20 cm. long and 1.5 cm. wide had been sealed at a point directly opposite the neck. The neck had been drawn down to a width of 1.5 cm. and attached to a greaseless vacuum tap via a ground glass joint, which facilitated the introduction of the less volatile reactants and the removal of the products.

The organic reactant and the halogen were introduced into the tube sealed to the flask and the halogen dissolved as far as possible in the organic phase. The tube and its contents were then brought to the temperature of solid carbon dioxide or liquid nitrogen and the air evacuated entirely from the flask. Diborane was then admitted to a pressure of 200–250 mm. (0.3–0.4 gram) at room temperature and the tap closed. The reactants in the tube were brought to room temperature and allowed to run into the spherical part of the flask by tilting through an angle of 90°. The disappearance of the halogen showed when the reaction was complete. The time required was normally 5–10 minutes at room temperature and was reduced slightly by rotating the flask slowly about the now horizontal axis of the tube and neck.

EXAMPLE I 11.1 grams of diethyl ether and 9.5 grams of iodine (molar ratio 2:1) yielded 10.0 grams of ethyl iodide, corresponding to a yield of 85% based on iodine according to the following scheme:

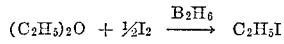

EXAMPLE II

Example I was repeated, except that bromine was used in place of iodine and, to test the stoichiometry of the reaction, the molar ratio was changed to 1:1. Reaction was complete in 5 minutes, but excess bromine still remained. 3.7 grams of diethyl ether and 8.0 grams of bromine gave 5.6 grams of ethyl bromide, corresponding to a yield of 51% based on bromine, the reduced yield corresponding to the change in molar ratio and agreeing with the equation proposed in the introduction. 0.049 gram of elementary hydrogen and some hydrogen bromide were also produced. The reaction scheme is as follows:

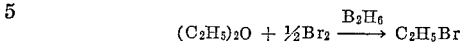

EXAMPLE III

Example I was repeated, except that 20 ml. of diglyme (di-(2-methoxyethyl)ether) was used in place of diethyl ether, and only 5.0 grams of iodine. Methyl iodide was obtained in approximately 80% yield based on iodine (4.4 grams), indicating that the attack on the diglyme takes place preferentially at the methoxy oxygen in the absence of sufficient iodine to iodinate the compound completely; the reaction scheme is as follows:

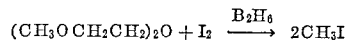

EXAMPLE IV 11.4 grams of phenyl methyl ether and 6.3 grams of iodine with 0.3 gram of diborane gave 6.6 grams of methyl iodide, corresponding to a yield of 85%. The reaction was slower than in the foregoing examples, requiring about 12 hours to complete. A boron ester was also produced which gave phenol on treatment with water; the reaction scheme is as follows:

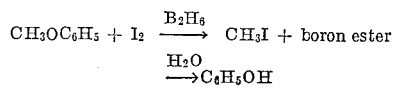

EXAMPLE V

Excess ethylene oxide was reacted with 6.3 grams of iodine in the presence of diborane to give a colourless liquid. Rather more heat than usual was evolved in this reaction. 2-iodoethanol was obtained from the product on treatment with cold water, but because of its solubility in the latter, some of it was lost. 4.6 grams of 2-iodoethanol boiling at 80° C. at ca. 10 mm. and 170° C. with decomposition at 1 atmosphere were isolated, corresponding to a yield of 54% of the purified product based on iodine; the reaction scheme is as follows:

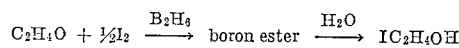

EXAMPLE VI

Example V was repeated using bromine (8.0 grams) in place of the iodine. Again the reaction was more exothermic than usual. Before adding water, 0.038 gm. of hydrogen, some hydrogen bromide and 0.5 gram of ethylene dibromide were pumped off from the principal product, which consisted of 7.5 grams of a dense liquid of low volatility. Tests on part of this, including a quantitative determination of the boric acid liberated on hydrloysis, indicated it to be almost pure tris-2-bromoethyl borate. From the remainder (6.3 grams) after treatment with water 4.9 grams of 2-bromoethanol, boiling point 150° C., were isolated, corresponding to a total yield of 47% based on bromine; the reaction scheme is as follows:

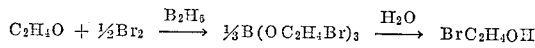

EXAMPLE VII 7.2 grams of tetrahydrofuran and 6.3 grams of iodine gave a colourless product with diborane from which 1.4 grams of unreacted tetrahydrofuran were recovered. After hydrolysis, 10.0 grams of 4-iodobutan-1-ol (purity >90%) were obtained, corresponding to a yield of >90% based on iodine; the reaction scheme is as follows:

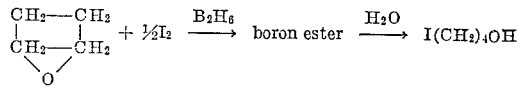

C, H and O analysis was carried out both on the 4-iodobutan-1-ol and on its p-nitrobenzoate derivative, which had an observed melting point of 104.5° C.

EXAMPLE VIII 1.6 grams of methyl alcohol and 6.3 grams of iodine (molar ratio 2:1) reacted completely within 10 minutes in the presence of 0.3 gram of diborane. 5.0 grams of pure methyl iodide were isolated from the products, corresponding to a yield of 70% based on iodine; the reaction scheme is as follows:

$$2CH_3OH + I_2 \xrightarrow{B_2H_6} 2CH_3I$$

In the foregoing eight examples, volatile products were in general pumped off from the reaction vessel and trapped at low temperatures. Less volatile products were removed as liquids and treated with water to decompose any boron intermediates, separated from the aqueous solution and fractionated.

EXAMPLE IX

Diethyl ether (6.0 g.) and iodine monobromide (10.3 g.) gave a colourless product with diborane. The reaction was smooth and moderately exothermic, completing itself within 15 minutes. The volatile reaction products were pumped off under vacuum at room temperature and condensed in a cold trap and weighed at 14.0 g. On fractionation on a semi-micro scale, only two fractions were obtained, which collected mainly at 40° and 72° C. These were identified by means of gas-liquid chromatography as ethyl bromide and ethyl iodide, but unreacted ether was also detected. The non-volatile residue collected from the reaction vessel weighed 2.0 g. On distillation, the greater part of it came over at 120° C. and proved to be triethyl borate, although the fact that it could not be pumped off at room temperature indicates that it was not orginally produced as such. From a consideration of the quantities of reactants and products, it is clear that the conversion of halogen to alkyl halides is virtually quantitative. The probable equation in this case is:

$$12(C_2H_5)_2O + 9IBr + 3B_2H_6 \rightarrow 9C_2H_5Br \\ + 9C_2H_5I + 2B_3O_3(OC_2H_5)_3 + 9H_2$$

and is followed, on distillation, by $$B_3O_3(OC_2H_5)_3 \rightarrow B_2O_3 + B(OC_2H_5)_3$$

EXAMPLE X

In this example, pentaborane-9 ($B_5H_9$) was used in place of diborane. The pentaborane (0.4 g.) was distilled into the evacuated reaction vessel already containing iodine (6.3 g.) and diethyl ether (1.9 g.) at the temperature of liquid nitrogen. The vessel was isolated and allowed to assume room temperature. Reaction was slower than with diborane, and about 24 hours was required for the colour of the iodine to disappear. After further standing, the volatile products were pumped out into a cooled trap, leaving only a small quantity (about 0.6 g.) of an almost white solid in the reaction vessel. Very little hydrogen had been produced in this reaction, in contrast to the previous examples with diborane. The yield of ethyl iodide, identified by gas-liquid chromatography, was almost quantitative, but the product contained small quantities of unreacted ether and pentaborane. It was washed, dried and distilled (B.P. 72° C.) to give 6.5 g. of purified product. A weighed amount of the solid from the reaction vessel titrated against sodium hydroxide in the presence of mannitol as a mixture of orthoboric and metaboric acids in proportions (and in total weight) close to those required by the equation:

$$12(C_2H_5)_2O + 12I_2 + B_5H_9 \rightarrow 24C_2H_5I + 3HBO_2 + 2H_3BO_3$$

It is clear that the boron skeleton of the pentaborane breaks down completely. The reaction is moreover a highly efficient one in which the pentaborane consumed produces around 60 times its weight of ethyl iodide.

EXAMPLE XI

This example was carried out in a 1-litre spherical flask to which a tubular projection 20 cm. long and 1.5 cm. wide had been sealed at a point directly opposite the neck. The neck had been drawn down to a width of 1.5 cm. and sealed onto a ground-glass joint, which in turn was connected to a vacuum tap.

Excess of diethyl ether (7 g.) and iodine (6 g.) were placed in the tubular projection and the iodine dissolved as far as possible in the ether. The ether solution was then frozen by inserting the tube in liquid nitrogen. Next the flask was held at an angle and 2.0 g. of commercial sodium borohydride (purity 95%) inserted into the main body of the flask. The vacuum tap was immediately placed in position at the ground glass joint and the air evacuated from the flask, which was then isolated by closing the tap. The ether solution was allowed to warm up and caused to run onto the sodium borohydride by holding the flask in a horizontal position. A somewhat exothermic reaction occurred at room temperature and was complete in about 1 hour, as shown by the disappearance of the colour of the iodine. Hydrogen and some hydrogen iodide were liberated and collected in the evacuated flask. The liquid products were distilled out of the flask, washed with water, and the non-aqueous layer dried. After purification by fractionation, it yielded 2.9 g. of ethyl iodide (boiling point 72° C.), which, based on the equation $$3Et_2O + 2I_2 + NaBH_4 \rightarrow 3EtI + NaI + B(OEt)_3 + 2H_2$$

corresponds to a yield of 52% of purified product with respect to iodine.

EXAMPLE XII

This example was carried out in a ½-litre stainless-steel autoclave. Commercial 95% sodium borohydride (4 g.) was placed in the autoclave. The iodine (50 g.) was dissolved as far as possible in 19.4 g. of methyl alcohol (an excess of that required for reaction) in a boiling tube, which was then cooled in liquid nitrogen to freeze the contents. The cold tube was placed in an inverted position in the autoclave, which was immediately closed and evacuated of air before the contents of the tube could warm up. The valve of the autoclave was closed while reaction occurred at room temperature. To ensure complete mixing the temperature was raised to 100° C. for 3 hours (although this heating would have been superfluous had the autoclave been provided with an agitating device). Subsequently methyl iodide and a small amount of unreacted methyl alcohol were distilled out of the autoclave and separated by fractional distillation. The yield of methyl iodide was 21 g. The residue in the autoclave contained unreacted iodine, which was originally present in excess of the amount required (38.1 g.) by the equation:

$$3MeOH + 2I_2 + NaBH_4 \rightarrow MeI + NaI + H_3BO_3 + 2H_2$$

indicating that the stoichiometry of $I_2:BH_4$ is indeed likely to be that indicated by the equation, according to which the yield of methyl iodide is 74%.

EXAMPLE XIII

The technique of this example was similar to Example XII. Again 4 g. of 95% sodium borohydride were placed in the autoclave and allowed to react with iodine (30 g.) in excess of diglyme (di- (2-methoxyethyl) ether) (28 g.) in lieu of methyl alcohol. At the end of the reaction the autoclave was heated to 100° C. for 3 hours (again to facilitate complete mixing). Subsequently 9.8 g. of nearly pure methyl iodide was distilled from the autoclave, but the viscous residue which remained in the autoclave still smelled strongly of methyl iodide, indicating that the true yield was higher than the yield of 39% actually recovered. The residue also contained a mixture of less volatile organic compounds of iodine.

EXAMPLE XIV

In this example an interesting isomerisation was observed. The technique was similar to that in Example XI. Di-n-butyl ether (7.8 g.) and iodine monochloride (11 g.) were frozen into the tubular limb of the flask and lithium borohydride (2.0 g.) was placed in the main body of the flask, which was then evacuated. On allowing the frozen reactants to warm up and come into contact with the lithium borohydride, a reaction occurred which was strongly exothermic and more vigorous than usual. The colour of the iodine monochloride was discharged within 15 minutes, and on cooling, the mass solidified. On adding water, the solid dissolved and hydrogen was liberated, presumably from the excess lithium borohydride. A heavy organic layer separated, which was washed several times, then separated off and fractionally distilled. Apart from a few drops distilling at 80–86° C., indicative of a trace of butyl chloride, the bulk of the liquid proved to be sec.-butyl iodide, boiling point 120° C. The yield was 11.6 g. or 93% based on the equation

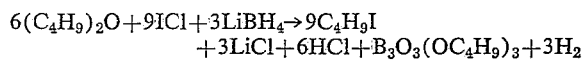

$$6(C_4H_9)_2O + 9ICl + 3LiBH_4 \rightarrow 9C_4H_9I + 3LiCl + 6HCl + B_3O_3(OC_4H_9)_3 + 3H_2$$

which, though tentative, explains all the experimental observations very well and implies that the reaction would have proceeded on as little as 0.5 g. of lithium borohydride. Moreover, this example shows experimentally that the proportion of alkyl radicals of the ether which can be converted to alkyl halide is not restricted to 50%.

EXAMPLE XV

The technique was similar to that in Example XI and XIV. Di-n-butyl ether (7.6 g.) and iodine trichloride (12 g.) were frozen into the tubular limb of the reaction flask. Lithium borohydride (1.5 g.) was now placed in the main body of the flask, which was subsequently evacuated and closed. The frozen reactants were allowed to melt and brought into contact a drop at a time with the lithium borohydride. A reaction occurred which was very much more vigorous than usual and required external cooling with refrigerants to remove the unusually large amount of heat evolved, especially in the initial stages. The colour of iodine monochloride developed immediately, but disappeared again within 15 minutes, when the reaction was complete. The volatile products were pumped off at room temperature and condensed in a cooled trap. On subsequent exposure to the air they fumed, apparently from dissolved hydrogen chloride. On fractionation the liquid yielded 0.4 g. of a distillate collection at 80–84° C. (tentatively identified as butyl chloride) and 6.2 g. of sec.-butyl iodide collecting 120° C. A further 2 ml. of liquid was washed from the reaction flask. This was also acid contaminated and yielded a further 1.1 g. of sec.butyl iodide, making 7.3 g. in all. As a tentative equation one can write:

$$6(C_4H_9)_2O + 6ICl_3 + 3LiBH_4 \rightarrow 6C_4H_9I + 3C_4H_9Cl + 3LiCl + B_3O_3(OC_4H_9)_3 + 12HCl$$

Once again, isomerisation had occurred. The yield of the iodide amount to 77% based on iodine, but the yield of the chloride was very poor, suggesting the chlorine may have preferentially reacted with the excess lithium borohydride present.

EXAMPLE XVI

Acetone (6.0 g.) was reacted with iodine (6.3 g.) and diborane (0.75 g.) according to the technique described for Examples I to X. Reaction was reasonably rapid and moderately exothermic. All the colour of the iodine disappeared. Excess diborane was pumped away. On distilling the liquid product a trace of unreacted acetone was observed and 6.3 g. of isopropyl iodide, boiling point 88–90° C., isolated, the identification of which was tentatively confirmed by gas-liquid chromatography. Yield 74% with respect to iodine.

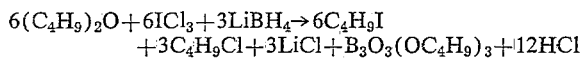

EXAMPLE XVII

Benzaldehyde (8.0 g.) was reacted with iodine (6.3 g.) and diborane (1.0 g.) as before. The reaction was slower than usual, but went to completion. On opening the flask after removal of excess diborane the lachrymatory properties of the benzyl iodide overcame the worker and necessitated clearing the laboratory. The yield was not recorded as a weight, for the experiment had to be abandoned, but at a visual estimation before opening the flask was high.

EXAMPLE XVIII

Alpha-naphthaldehyde (7.8 g.) was reacted with iodine (6.3 g.) and diborane (0.75 g.). Although relatively slow, the reaction went to completion to yield a yellow oil with lachrymatory properties from which alpha-naphthyl iodide was isolated in approximately 80% yield. Identification of the product was confirmed by the thiouronium iodide (M.P. 179°, literature 181–2° C.) prepared by boiling with thiourea in ethanol for 2 hours.

As will be noted from the above, comparable advantages to those obtainable with boron hydrides, and in this respect metal borohydrides provide a useful alternative to the boron hydride.

While numerous other applications of the invention besides those outlined above are of course possible it will be noted that the principal advantages are in respect of:

(a) possible cheaper synthetic routes to organic halides of commercial interest;
(b) simplicity in producing certain organic halides from others and alcohols;
(c) the cleaving of ethers at room temperature and under milder conditions than hitherto possible;
(d) quicker and cheaper demethoxylating and dealkoxylating reactions.

In connection with (a) and (b) above, the yields mentioned in the examples were those observed in the original trial runs without any special precautions. With careful manipulation and control considerably improved yields can be obtained, and in many cases the reactions are close to quantitative.

The invention may also enable the production of organic halides which are novel compounds per se. Amongst these is included 4-iodobutan-1-ol.

What we claim is:

1. A process for the preparation of an organic halide which comprises reacting in the liquid phase an organic compound selected from the group consisting of (a) ethers, (b) epoxides, (c) alcohols, (d) aldehydes and (e) ketones, said compound containing only the functional groups characteristic of (a) through (e), inclusive, with a halogen selected from the group consisting of chlorine, bromine, iodine and interhalogen compounds thereof, and a boron compound selected from the group consisting of boron hydrides, alkali metal borohydrides and alkaline earth metal borohydrides.

2. The process of claim 1 wherein the organic compound is an ether.

3. The process of claim 1 wherein the organic compound is an epoxide.

4. The process of claim 1 wherein the organic compound is an alcohol.

5. The process of claim 1 wherein the organic compound is an aldehyde.

6. The process of claim 1 wherein the organic compound is a ketone.

7. The process of claim 1 wherein the halogen is elementary iodine.

8. The process of claim 1 wherein the halogen is elementary bromine.

9. The process of claim 1 wherein the interhalogen compound is iodine monochloride.

10. The process of claim 1 wherein the boron compound is a boron hydride.

11. The process of claim 1 wherein the boron compound is diborane.

12. The process of claim 1 wherein the boron compound is an alkali metal borohydride.

13. The process of claim 1 wherein the organic compound is an alcohol, an ether or an epoxide and the molar ratio of hydroxyl, ether or epoxide group thereof, respectively, to the halogen is substantially stoichiometric.

14. The process of claim 1 wherein the organic compound is a monohydric alcohol, the boron compound is diborane, and the molar ratio of the alcohol to diborane is about 6:1.

References Cited

UNITED STATES PATENTS 2,889,380  6/1959  Hamel _____ 260—633

FOREIGN PATENTS 861,945  3/1961  Great Britain.

OTHER REFERENCES

Bohlmann et al.: Ber. 94, p. 3191, 1961.

LEON ZITVER, *Primary Examiner.*

H. T. MARS, *Assistant Examiner.*

UNITED STATES PATENT OFFICE
CERTIFICATE OF CORRECTION

Patent No. 3,381,040                                April 30, 1968

Leonard Haynes Long et al.

It is certified that error appears in the above identified patent and that said Letters Patent are hereby corrected as shown below:

Column 6, lines 71 to 74, the left-hand portion of the formula should appear as shown below:

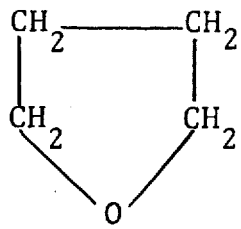

Column 8, line 56, "MeI" should read -- 3 MeI --. Column 9, line 52, "collecting 120° C." should read -- collecting at 120° C. --. Column 10, line 22, "boron hydrides, and" should read -- boron hydrides can be achieved with the present metal boron hydrides and --.

Signed and sealed this 9th day of December 1969.

(SEAL)
Attest:

EDWARD M. FLETCHER, JR.                         WILLIAM E. SCHUYLER, JR.
Attesting Officer                                         Commissioner of Patents